United States Patent
Conlon et al.

(10) Patent No.: US 10,500,980 B2
(45) Date of Patent: Dec. 10, 2019

(54) MODULAR BATTERY PACK SYSTEM WITH SERIES AND PARALLEL CHARGING AND PROPULSION MODES

(71) Applicant: GM Global Technology Operations LLC, Detroit, MI (US)

(72) Inventors: Brendan M. Conlon, Rochester Hills, MI (US); Martin M. Freedman, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 15/920,899

(22) Filed: Mar. 14, 2018

(65) Prior Publication Data

US 2019/0283611 A1    Sep. 19, 2019

(51) Int. Cl.

| | |
|---|---|
| *B60L 58/22* | (2019.01) |
| *H02P 5/74* | (2006.01) |
| *B60L 3/00* | (2019.01) |
| *B60L 53/20* | (2019.01) |
| *B60L 53/14* | (2019.01) |

(52) U.S. Cl.
CPC .............. *B60L 58/22* (2019.02); *B60L 3/0046* (2013.01); *B60L 53/14* (2019.02); *B60L 53/20* (2019.02); *H02P 5/74* (2013.01); *B60L 2210/40* (2013.01)

(58) Field of Classification Search
CPC .......... B60L 58/22; B60L 53/20; B60L 53/14; B60L 3/00465; B60L 2210/40; H02P 5/74
See application file for complete search history.

(56) References Cited

U.S. PATENT DOCUMENTS

2018/0056798 A1* 3/2018 Syouda ................. H02J 7/0019

* cited by examiner

*Primary Examiner* — Carlos Amaya
(74) *Attorney, Agent, or Firm* — Quinn IP Law

(57) ABSTRACT

A modular battery pack system includes a battery pack and controller. The battery pack has first and second battery modules interconnected via electrical cables, with each module having a battery cell string. The pack has first, second, and third electrical connectors and four switches that selectively connect the strings to one or more of the electrical connectors. A DC charging connector is electrically connected to one of the cables between the first electrical connectors of the battery modules, and electrically connects the pack to an off-board DC fast-charging station. In response to input signals corresponding to a requested mode, the controller commands an open/closed state of each of the switches, via switching control signals, to establish a series charge mode, a parallel charge mode, and one or more of a series and/or parallel drive mode of the battery pack. A motor vehicle includes the system.

20 Claims, 7 Drawing Sheets

| VM | SA1 | SA2 | SA3 | SA4 | SB1 | SB2 | SB3 | SB4 |
|---|---|---|---|---|---|---|---|---|
| PWR- | O | O | O | O | O | O | O | O |
| PD | X | X | O | O | X | X | O | O |
| PCh | X | X | O | X | X | X | X | X |
| SD | O | X | X | O | X | O | O | X |
| SCh1 | X | X | X | X | O | O | X | X |
| SCh2 | O | O | X | X | X | X | X | X |
| SCh3 | O | O | X | X | O | O | X | X |
| RESS #1D | X | O | O | O | O | O | O | O |
| RESS #2D | O | X | O | O | X | X | O | O |
| RESS #1Ch | X | X | O | X | X | O | X | O |
| RESS #2Ch | O | X | O | X | X | X | X | O |

FIG. 3

MODULAR BATTERY PACK SYSTEM WITH SERIES AND PARALLEL CHARGING AND PROPULSION MODES

INTRODUCTION

An electric powertrain typically includes one or more polyphase/alternating current (AC) electric machines. Phase windings of the electric machines are individually energized using a power inverter and a high-voltage, multi-cell direct current (DC) battery pack. Switching state control of semiconductor switching pairs located within the power inverter ultimately generates an AC output voltage suitable for energizing the machine phase windings. The energized phase windings ultimately induce torque-producing machine rotation and motor torque.

A high-voltage DC battery pack forms a core part of a rechargeable energy storage system of the type used in modern electric vehicles, hybrid electric vehicles, and other mobile or stationary high-voltage systems. The battery pack may be selectively recharged in some system configurations using charging power provided by an off-board AC or DC power supply. When the off-board power supply produces a charging voltage having an AC waveform, an AC-DC converter aboard the system being charged converts the AC waveform to a DC waveform suitable for charging battery cells within the battery pack. Alternatively, a DC fast-charging system may be used as a relatively high-power/high-speed charging option.

The voltage capacity of a battery pack used for energizing propulsion functions aboard a modern vehicle having an electric powertrain continues to increase in order to extend the electric driving range and improve overall driving performance. DC fast-charging infrastructure and charging methodologies likewise continue to evolve so as to keep pace with battery capacity improvements. However, the deliberate pace of integration of higher-power DC fast-charging stations into existing battery charging infrastructure should ensure a continued need for older, lower-power "legacy" charging stations for the foreseeable future. As a result of this trend, a given DC fast-charging station may or may not be capable of fully charging certain battery packs.

SUMMARY

The present disclosure relates to a modular, high-voltage battery pack and a switching control circuit that, when used together, help to ensure a level of backward-compatibility of the battery pack with legacy off-board DC fast-charging stations. A vehicle may be powered solely using electricity from the battery pack, e.g., a battery electric vehicle or BEV, or in a hybrid electric vehicle (HEV) configuration in which combustible fuel is also used to fire an engine. Either vehicle type, as well as in other systems such as power plants, is equipped with a battery pack having a maximum voltage capacity that may exceed the maximum charging voltage capability of the DC fast-charging station.

As an illustrative example, a 400-500 volt DC (VDC) battery pack may be fully charged using a 400-500 VDC charging voltage from a legacy DC fast-charging station. However, emerging battery packs may be rated for 800-1000 VDC or higher, and thus are unable to achieve a full state of charge at such relatively low charging levels. The present approach enables identically-configured modular battery packs, e.g., each rated for 400-500 VDC for a total voltage of 800-1000 VDC in the above 800-1000 VDC example application, to provide a solution to the backward compatibility problem with legacy DC fast-charging stations.

In a particular embodiment, a modular battery pack system includes a battery pack and a controller. The battery pack includes substantially identical first and second battery modules electrically interconnected to each other via external electrical cables. The first and second battery modules have a respective battery cell string, first, second, and third electrical connectors, and first, second, third, and fourth switches. The switches, when closed, selectively connect the battery cell strings to one or more of the electrical connectors of the respective battery packs. The system also includes a multi-pin DC charging connector that is electrically connected to one of the electrical cables between the first electrical connectors of the first and second battery modules, with the DC charge connector configured to electrically connect the battery pack to an off-board DC fast-charging station.

The controller, which is in communication with each of the switches, is configured to command an open or closed state, i.e., selectively open or close some or all of the first, second, third, and fourth switches, via switching control signals. This is done in response to a requested operating mode, whether operator requested or autonomously requested. Based on the mode, the controller selectively establishes a series charge mode, a parallel charge mode, and one or more of a series drive mode and a parallel drive mode of the battery pack, with the controller programmed to execute all of these modes.

Multiple series charge modes may be possible in other embodiments, as well as execution of an additional pair of drive modes and an additional pair of charging modes in which the controller disconnects one of the two battery modules during driving or charging, respectively, e.g., in response to a detected fault condition.

The first and second battery modules may have a respective voltage capacity of 400-500 VDC such that the battery pack has a voltage capacity of 800-1000 VDC when operating in the series drive mode and the series charge mode.

At least one of the first, second, third, and fourth switches of the first and second battery modules may be an electromechanical contactor in some embodiments. In other embodiments, at least one of the first, second, third, and fourth switches may be a solid-state switch and a diode.

The first and second battery modules may optionally include a fourth electrical connector in parallel with the third electrical connector, e.g., with an auxiliary circuit connected to the fourth electrical connector.

The first and second switches, when in a closed state, connect the battery cell string of a respective one of the first and second battery modules to the second and third electrical connectors of the first and second battery modules, respectively. The third and fourth switches, when in a closed state, connect the battery cell strings of a respective one of the first and second battery modules to the first electrical connector of the first and second battery modules, respectively.

The series charge mode may include at least a first and a second series charge modes, with the controller configured, responsive to a threshold divergence in a state of charge of the first and second battery modules, to alternate between the first and second series charge modes by changing the open or closed states of the first and second switches of the first and second battery modules.

The system may include first and second traction power inverter modules (TPIMs) directly connected to the third electrical connector of the first and second battery modules, respectively, and first and second electric machines connected to the first and second TPIMs, respectively.

The system may be used aboard a vehicle having front and rear drive wheels respectively connected to front and rear drive axles, the front and rear drive axles being driven by the first and second battery modules, respectively.

The first and second battery modules may have a respective first surface to which the electrical connectors of the respective first and second battery modules are connected, and a second surface positioned opposite the first surface and characterized by an absence of the electrical connectors. In some embodiments, the first and second battery modules may be arranged in the battery pack such that the second surfaces are positioned immediately adjacent to one another.

The controller may selectively establish a power-down mode in which the first, second, third, and fourth switches of the first and second battery modules are opened via the set of switching control signals.

The controller may be configured to detect a fault mode in which a fault is present in the first or second battery modules, and to enter a default drive or charging operating mode using the first or second battery module not experiencing the fault.

A vehicle is also disclosed herein having the system noted above, as well as front and rear drive wheels connected to front and rear drive axles, respectively, and front and rear electric machines connected to and driven by front and rear TPIMs, respectively.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a table of possible series and parallel operating modes and corresponding switching states for control of the high-voltage battery pack of FIG. 2.

Figure 1:
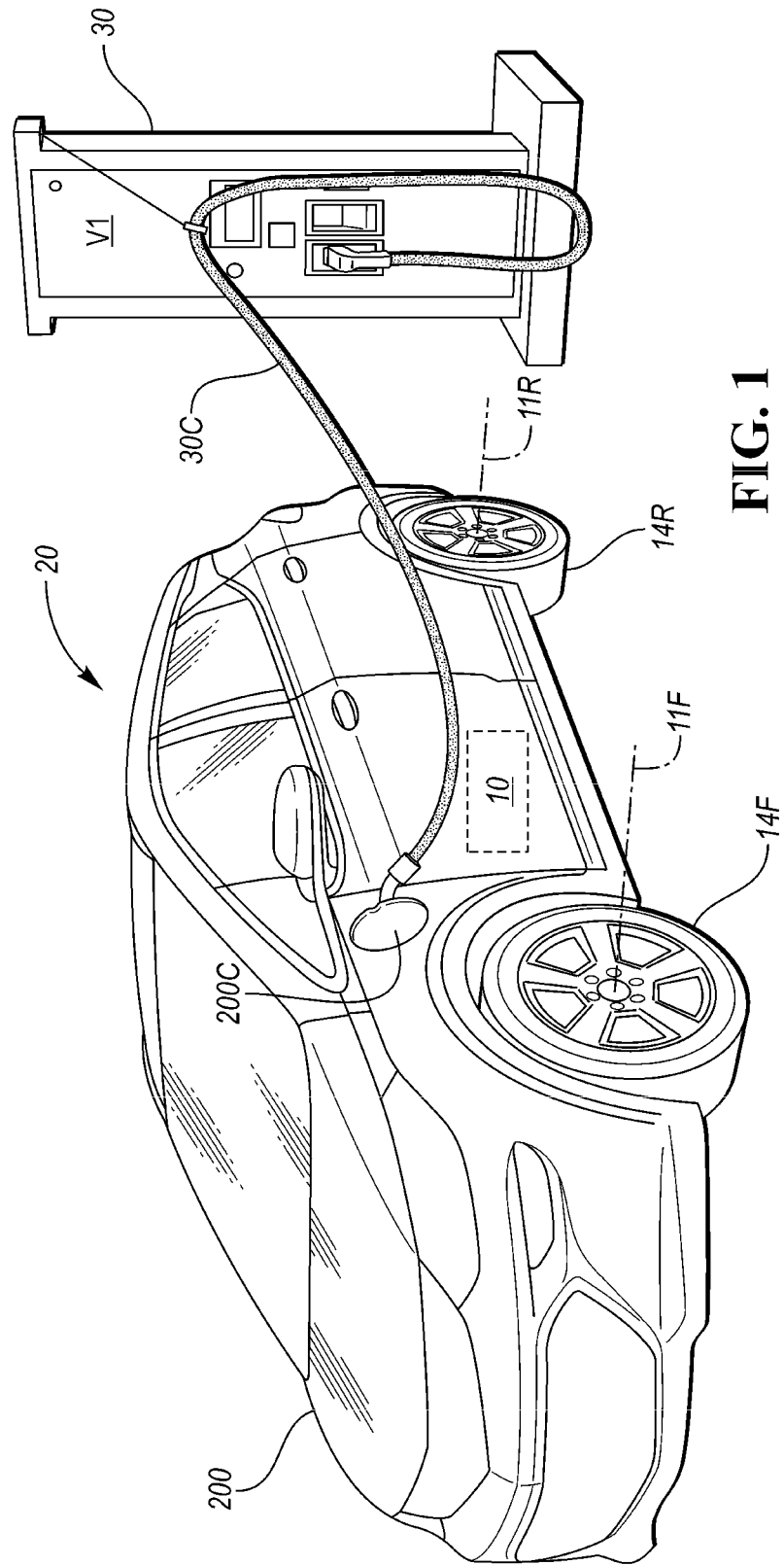
FIG. 1 is a schematic illustration of an example motor vehicle undergoing a DC fast-charging operation, with the vehicle having a high-voltage battery pack constructed from a pair of lower-voltage battery modules with a switching control circuit as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a modular, multi-cell high-voltage battery pack 10 as shown schematically in FIG. 1 used as part of a powertrain of an example motor vehicle 20 having a vehicle body 200. The vehicle 20 is shown undergoing a direct current (DC) fast-charging operation in which the battery pack 10 is electrically connected to an off-board DC fast-charging station 30, via a vehicle charging port 200C that is internally connected to a DC charge connector 40 (see FIGS. 2 and 4-7), using a length of high-voltage charging cable 30C. Although not shown in FIG. 1, the end connection of the charging cable 30C to the charging port 200C may be an SAE J1772 or CHAdeMO charge connector, or another suitable regional or national standard charging plug or connector. The present teachings are independent of the particular charging standard ultimately employed in a DC fast-charging operation involving the DC fast-charging station 30, and therefore the above-noted examples are merely illustrative.

The battery pack 10, the internal structure and switching control of which is described in detail below with reference to FIGS. 2-7, may be used as part of the motor vehicle 20 or as part of other electrical systems such as stationary or mobile power plants, robots, or platforms. For vehicular applications, non-motor vehicles such as aircraft, marine vessels, and rail vehicles may enjoy similar benefits. Likewise, the battery pack 10 may be used as part of a powertrain of a mobile system such as the example vehicle 20, or in configurations in which the DC fast-charging station 30 is mobile and the system in which the battery pack 10 is employed remains stationary. For illustrative consistency, an example application of the battery pack 10 used as an integral part of the vehicle 20 in a motor vehicle context will be described hereinafter without limiting the present disclosure to such an embodiment.

The vehicle 20 of FIG. 1 includes front and rear drive wheels 14F and 14R, respectively. The drive wheels 14F and 14R are connected to separate front and rear drive axles 11F and 11R, respectively, in an all-wheel drive (AWD) configuration of the vehicle 20. As described below with particular reference to FIG. 2, in such an AWD embodiment the drive axles 11F and 11R may be individually powered by electric machines 60 ($M_A$) and 160 ($M_B$) energized to function as traction motors via corresponding traction power inverter modules 25 and 125.

The vehicle body 200 shown in FIG. 1 may define or include the charging port 200C at a user-accessible external location. The vehicle 20 may be variously embodied as a plug-in electric vehicle having the battery pack 10, e.g., a multi-cell lithium ion, zinc-air, nickel-metal hydride, or lead acid battery pack 10, that can be selectively recharged via a DC fast-charging voltage V1 from the off-board DC fast-charging station 30. When the vehicle 20 is in operation, switching control of the battery pack 10 is performed by a controller 50 (FIG. 2) to ultimately generate and deliver motor torque to the drive wheels 14F and/or 14R and thereby propel the vehicle 20, or to perform other useful work. Thus, the battery pack 10 and the controller 50 together form a modular battery pack system.

Figure 2:
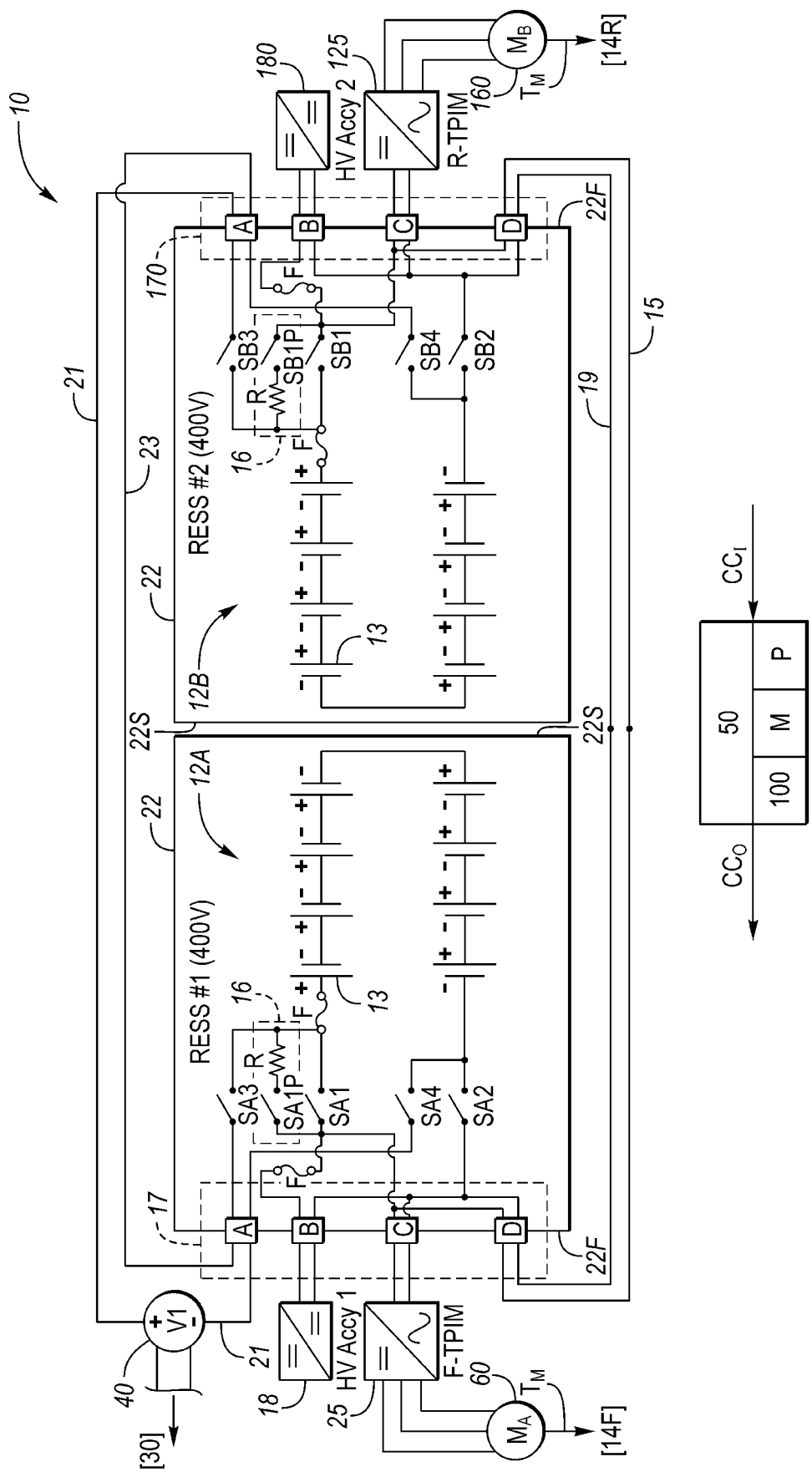
FIG. 2 is a schematic circuit diagram of a high-voltage battery pack and a controller usable as part of the example vehicle shown in FIG. 1.

Referring to FIG. 2, the battery pack 10 shown schematically in FIG. 1 may be constructed of two battery modules 12A and 12B used as a core part of respective first and second rechargeable energy storage systems RESS #1 and RESS #2. In the depicted example embodiment, the battery modules 12A and 12B are substantially identical, i.e., have the same internal components and equal voltage capacities, e.g., of 400-500 VDC, although other voltage levels may be envisioned. The battery modules 12A and 12B may be optionally connected together back-to-back as shown in FIG. 2 and thereafter controlled by the controller 50 using switching control logic, as illustrated in a logic table 35 of FIG. 3, to receive or output a 400 VDC voltage from or to a corresponding front traction power inverter module (F-TPIM) or rear traction power inverter module (R-TPIM) 25 or 125 each connected to an electric machine 60 or 160 on a respective one of the drive axles 11F or 11R of FIG. 1, or to receive or output an 800 VDC voltage depending on the operating mode. As described below, the disclosed configuration of the battery pack 10 enables selection by the controller 50 of a parallel drive mode, one or more series charge modes, a parallel drive mode, and a series drive mode as detailed in FIGS. 4, 5, 6, and 7, respectively. Fault-based mode selection of one of a pair of RESS drive or charge modes is also possible, as detailed below with reference to FIG. 3.

Still referring to FIG. 2, switching state control of the battery pack 10 is performed by operation of the controller 50. The controller 50 has a processor (P) and memory (M), i.e., via transmission of a set of switching control signals (arrow $CC_O$). Memory (M) includes tangible, non-transitory memory, e.g., read only memory, whether optical, magnetic, flash, or otherwise. The controller 50 also includes application-sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute instructions 100 embodying a switching control method, with the controller 50 receiving input signals (arrow $CC_I$) indicative of a driver-requested or autonomously-requested operating mode of the battery pack 10 and, in response, outputting the switching control signals (arrow $CC_O$). The input signals (arrow $CC_I$) may be determined during charging as part of ongoing communication between the controller 50 and the DC fast-charging station 30 of FIG. 1 upon connection of the vehicle 20 to station 30 of FIG. 1, such as when the station 30 communicates its maximum charging voltage (V1) to the controller 50. In drive mode, the operator's or an autonomously-determined propulsion request may cause the controller 50 to use parallel or series drive mode, e.g., in an all-wheel drive (AWD) mode.

As noted above, the battery pack 10 of FIG. 2 is configured to provide the vehicle 20 of FIG. 1 with AWD capability. The individual battery modules 12A and 12B may be electrically connected to separate front and rear drive components of the vehicle 20, parts of which are shown in FIG. 2 as the respective F-TPIM 25 and R-TPIM 125. To this end, the battery modules 12A and 12B are equipped with respective high-voltage electrical connector sets 17 and 170. The electrical connector sets 17 and 170 include a respective plurality of electrical connectors, such as four electrical connectors labeled A, B, C, and D for clarity. The traction power inverter modules 25 and 125 are respectively connected to the battery modules 12A and 12B via the electrical connectors C. Additionally, high-voltage accessory circuits 18 and 180, respectively labeled "HV Accy 1" and "HV Accy 2" in FIG. 2, may be connected to the respective battery modules 12A and 12B via the electrical connectors B.

In lieu of the electrical connectors B, the high-voltage accessory circuits 18 and 180 may be alternatively connected to the electrical connectors C, and therefore the electrical connectors B in parallel with a corresponding one of the electrical connectors C may be considered optional. However, electrical connectors B may provide the benefit of an output for separately-fused, lower power loads, thereby allowing for smaller load-appropriate construction of the electrical connector B.

As used herein, the terms "front" and "rear" refer to relative driving positions with respect to a front and rear end of the vehicle 20 shown in FIG. 1, in which the front and rear drive axles 11F and 11R are connected to the respective front and rear drive wheels 14F and 14R. Thus, the F-TPIM 25 and a corresponding electric machine 60 power the front drive axle 11F and the R-TPIM 125 and another corresponding electric machine 160 power the rear drive axle 11R. The accessory circuits 18 and 180 may be similarly disposed in order to performing front or rear-designated accessory functions, such as an auxiliary power module, a high voltage motor control module, or a battery cooling module performing thermal regulation functions of the respective battery modules 12A and 12B.

The battery modules 12A and 12B shown in FIG. 2 are contained within a respective battery housing 22. Each battery housing 22 has respective first and second faces 22F and 22S. The first faces 22F are lateral sides of the battery housing 22 containing the set of connectors 17 and 170. The second faces 22S are diametrically opposite the first faces 22F and are characterized by an absence of the set of electrical connectors 17 and 170. In the example configurations of FIGS. 2 and 4-7, therefore, the battery modules 12A and 12B, each at half the voltage capacity of the battery pack 10 as a whole, are arranged back-to-back, i.e., with the second faces 22S positioned immediately adjacent to one another and the first faces 22F providing access for operators when interconnecting the battery modules 12A and 12B during assembly of the battery pack 10. Other embodiments may be envisioned in which the first and second battery modules 12A and 12B, or the RESS #1 or #2, has a slanted surface or a protrusion, and/or with some of the electrical connectors of sets 17 or 170 located on a top or bottom of the housings 22. Thus, the example "back-to-back" configuration is non-limiting, with other packaging embodiments being possible, e.g., one in which the battery module 12B is rotated 180° relative to the schematic depiction of FIGS. 2 and 4-7.

Still referring to FIG. 2, first, second, third, and fourth electrical cables 15, 19, 21, and 23 of a voltage-suitable insulation and current-suitable gage construction are used to interconnect the battery modules 12A and 12B via the set of electrical connectors 17 and 170. Specifically, the first and second electrical cables 15 and 19 extend between the electrical connectors D with no intervening structure, i.e., the electrical connectors D are directly connected to each other and extend externally with respect to the housings 22. Similarly, the electrical connectors A are directly connected to each other via the fourth electrical cable 23. Separately, the third electrical cable 21 connects the electrical connectors A via the intervening DC charge connector 40, i.e., the physical multi-pin receptacle configured to receive the charging cable 30C shown in FIG. 1. The HV accessory circuits 18 and 180 plug directly into the electrical connectors B. In the same manner, cables connected to the respective front and rear TPIMs 25 and 125 directly plug into the electrical connectors C.

Internally, the battery modules 12A and 12B are identically configured as noted above. That is, the battery modules 12A and 12B have a respective plurality of battery cells 13, hereinafter collectively referred to as battery cell strings 13, fuses F, and a pre-charge circuit 16 having a pre-charge resistor (R). Additionally, the battery module 12A includes a first plurality of switches individually labeled as SA1, SA2, SA3, SA4, and SA1P, with the switch SA1P being a designated pre-charge switch. Similarly, the battery module 12B includes an identical second plurality of switches, individually labeled as SB1, SB2, SB3, SB4, and SB1P, with SB1P being a pre-charge switch.

The battery modules 12A and 12B may provide propulsion power to the vehicle 20 shown in FIG. 1 in some embodiments. The depicted configuration is intended to provide the requisite electrical connections for interfacing the battery pack 10 to the vehicle 20 in an AWD configuration using two power inverters, i.e., the F-TPIM 25 and the R-TPIM 125, the HV accessory circuits 18 and 180, and the DC charge connector 40, and the ultimate connection of such components to the DC fast-charging station 30 shown in FIG. 1.

Using the disclosed approach, a single battery module configuration enables multiple levels of battery output power and energy. Wiring embodied by the respective first, second, third, and fourth electrical cables 15, 19, 21, and 23, all of which extend external to the battery housings 22 to facilitate manufacturing and assembly of the battery pack 10, enables the identical configuration of the battery modules 12A and 12B. The depicted wiring circuit of FIG. 2 also allows the controller 50 to configure the battery modules 12A and 12B in real-time, in either series or parallel, for mode-specific charging of the battery pack 10 or propulsion of the vehicle 20 shown in FIG. 1.

Referring to FIG. 3, the logic table 35 includes a vehicle mode column (VM) and multiple switch state columns SA1-SA4 and SB1-SB4. Each of the switch state columns 38 is labeled with the switch identifier corresponding to the labels used in FIG. 2, i.e., SA1-SA4 and SB1-SB4. The pre-charge switches SA1P and SB1P are omitted from FIG. 3, but corresponding states of the pre-charge switches SA1P and SB1P are described below where relevant.

The switches SA1-SA4, SB1-SB4, SA1P, and SB1P may be electro-mechanical switches, such as contactors or relays, which can block current flow in either direction. Alternatively, the switches SA1-SA4, SB1-SB4, SA1P, and SB1P may be configured as semiconductor switches such as IGBTs, or MOSFETs, with or without anti-parallel connected diodes, employed singly or in combination. As will be appreciated by those of ordinary skill in the art, many types of commercially-available semiconductor switches are able to block current flow in one direction, a characteristic that potentially requires back-to-back connection of such switches for bi-direction current blocking and, in some cases, the use of the above-noted anti-parallel connected diodes. Logic table 35 is populated with corresponding mode-specific switch open/closed states, with "O" corresponding to an open switch state in which an open circuit is formed, i.e., the switch is not conducting electricity, and "X" corresponding to a closed switch state in which the switch is conducting. Possible operating modes selectable in real-time by the controller 50 of FIG. 2 according to the logic table 35 include a power-down mode (PWR-), a parallel drive mode (PD), a parallel charging mode (PCh), a series drive mode (SD), and three series charging modes (SCh1, SCh2, and SCh3). Additionally, the logic table 35 includes a pair of fault-based default RESS drive modes (RESS #1D and RESS #2D) and a pair of RESS charge modes (RESS #1Ch, RESS #2 Ch).

POWER-DOWN MODE (PWR-): the possible operating modes of mode column 36 include a power-down (PWR-) mode in which the vehicle 20 of FIG. 1 is placed in a true off state, such as when the controller 50 detects that the vehicle 20 has been parked in a key-off state and is not charging or otherwise running. The controller 50 commands the switches SA1-SA4 and SB1-SB4 to open in response to detection of this mode. Thus, the battery modules 12A and 12B of FIG. 2 are disconnected from each other, from the F-TPIM 25 and R-TPIM 125, and from the HV accessory circuits 18 and 180.

Figure 4:
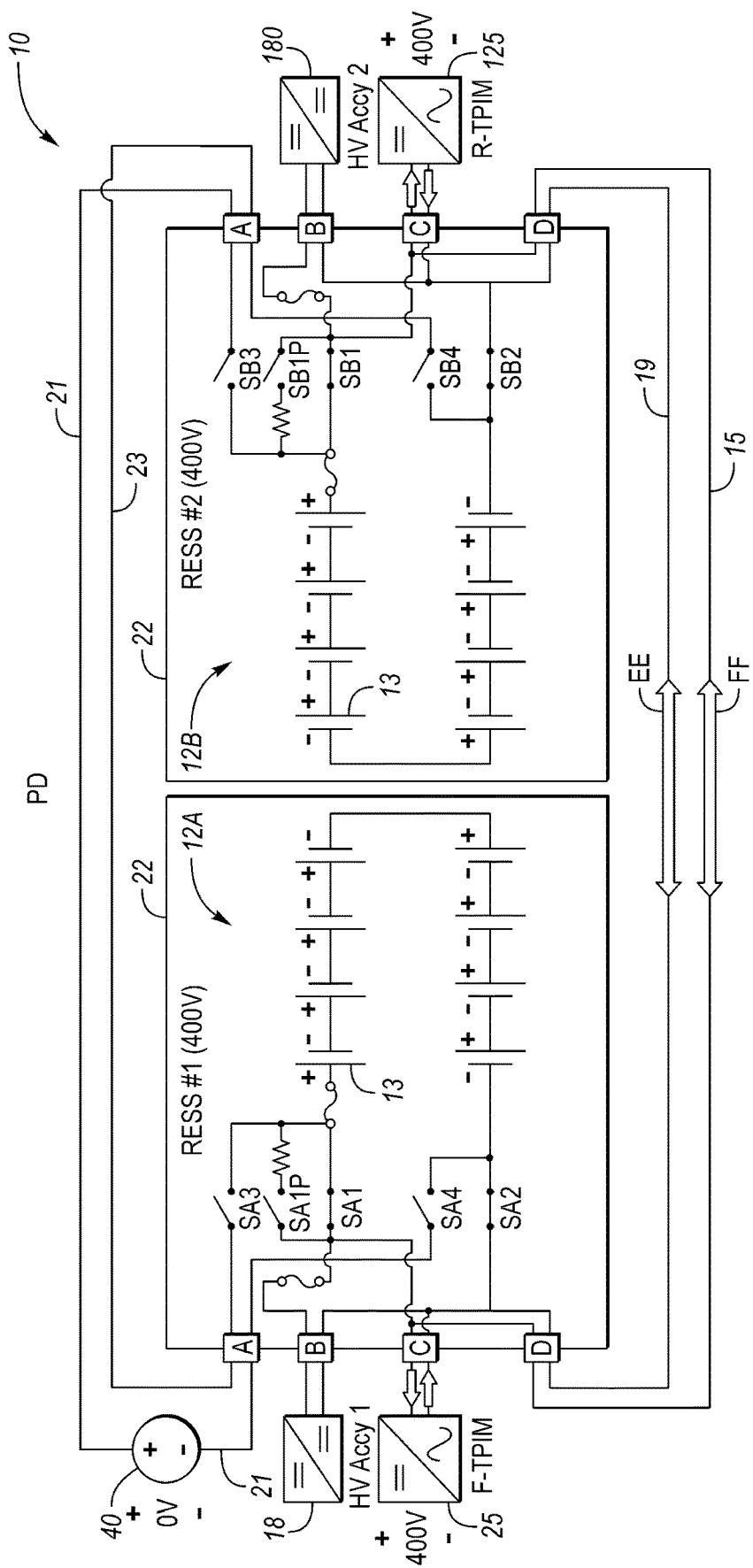
FIGS. 4-7 are schematic circuit diagrams and corresponding switching states of the high-voltage battery pack of FIG. 2 for an example parallel drive mode, a series charge mode, parallel charge mode, and series drive mode, respectively.

PARALLEL DRIVE MODE (PD): in parallel drive mode, which is depicted schematically in FIG. 4 with 0 VDC provided by the (disconnected) DC fast-charging station 30 of FIG. 1, the controller 50 of FIG. 2 closes the switches SA1 and SA2. This control action electrically connects the battery module 12A to the F-TPIM 25 and the HV accessory circuit 18. Corresponding switches SB1 and SB2 located in the battery module 12B are also commanded to close so as to connect the battery module 12B to the R-TPIM 125 and the HV accessory circuit 180. The pre-charge switches SA1P and/or SB1P, both shown in an open state in FIG. 4, may be used to pre-charge an external capacitance before closing the switches SA1 and/or SB1. Additionally, in the event the battery modules 12A and 12B are at significantly different states of charge, such that a high electrical current would tend to flow between the battery modules 12A and 12B, closing of pre-charge switches SA1P and/or SB1P would help limit such current flow and thereby allow for equalization.

With the switches SA1, SB1, SA2, and SB2 closed/conducting, the battery modules 12A and 12B and the HV accessory circuits 18 and 180 are connected in electrical parallel via the electrical cables 15 and 19 extending between power connectors D of FIG. 2. This external connection provides current flow paths (arrows EE and FF) for balancing currents while ensuring that the battery modules 12A and 12B maintain at the same state of charge, regardless of the power balance between the F-TPIM 25 and the R-TPIM 125. As part of the parallel drive mode, the switches SA4 and SB3 are opened by the controller 50 so as to isolate connector pins of the DC charge connector 40.

SERIES CHARGE MODES (SCh1, SCh2, SCh3): in series charge mode, three of which are possible via the logic table 35 of FIG. 3, the battery cell strings 13 of the battery modules 12A and 12B are connected in series. Thus, the charging current from the off-board power supply 30 of FIG. 1 is supplied to the battery modules 12A and 12B in series, as indicated by arrows AA and BB of FIG. 5 as described in detail below. Switches SA3, SA4, SB3, and SB4 are closed in this mode.

Additionally, one pair of the switches (SA1, SA2) or (SB1, SB2) may be closed, with the pair corresponding to series charge mode SCh1 or SCh2 in FIG. 3. This control action also connects the front and rear propulsion circuits, i.e., the F-TPIM 25 with electric machine 60 and the R-TPIM 125 with electric machine 160, and connects the HV accessory circuits 18 and 180 to either battery module 12A or 12B, thereby allowing the operating voltage limits of the propulsion and accessory components to be met. Series charge mode SCh3 is enabled when both pairs of the switches (SA1, SA2) and (SB1, SB2) are open and switches SA3, SA4, SB3, and SB4 are closed. In this mode, an equal charging current will flow through both battery cells strings 13, since neither the propulsion circuits using the TPIMs 25 and 125 nor the HV accessory circuits 18 and 180 are connected.

Figure 5:
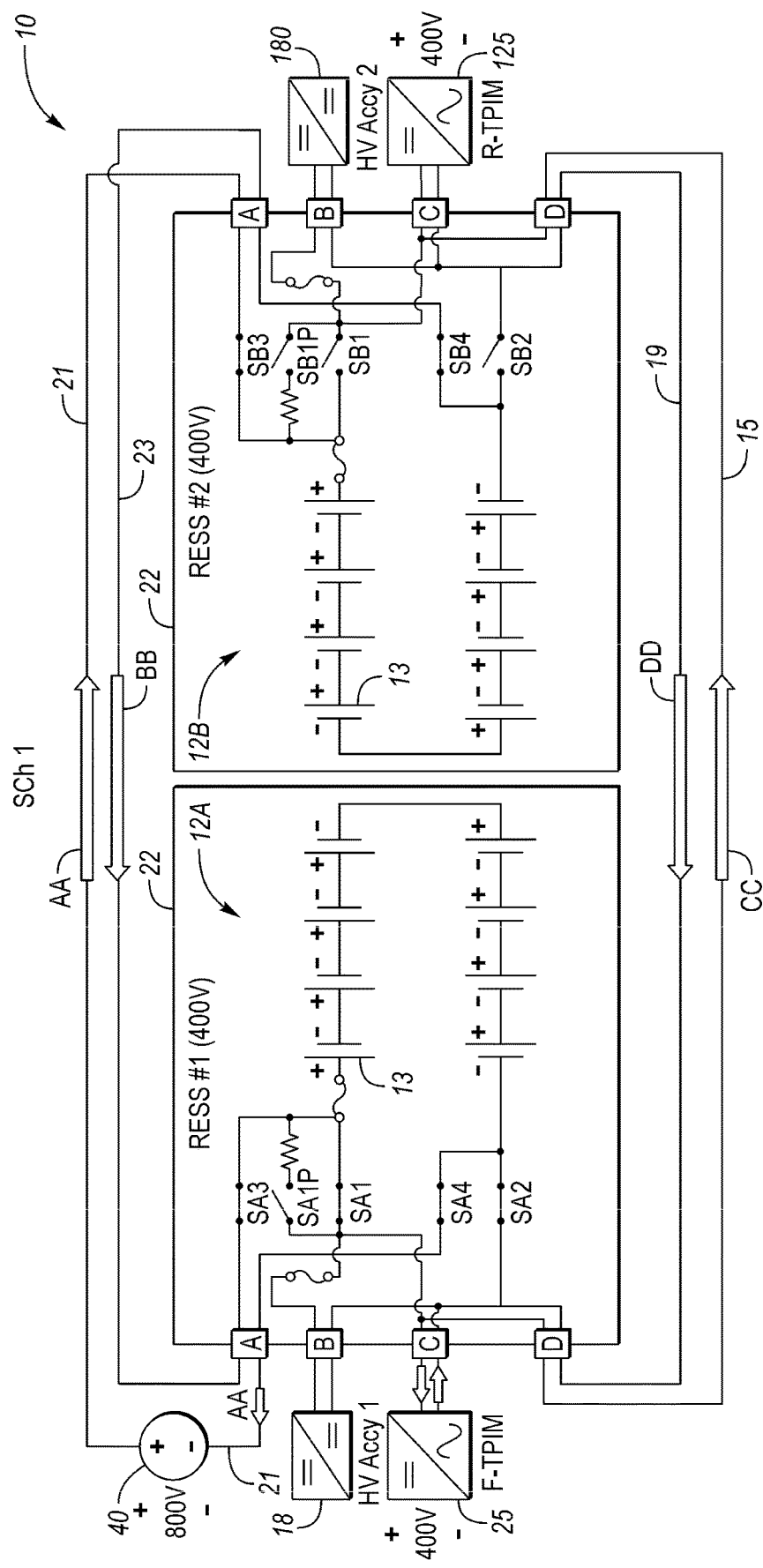

FIG. 5 depicts series charge mode SCh1 with an 800 VDC charging voltage from the DC fast-charging station 30 (FIG. 1), i.e., with the switches SA1 and SA2 closed by action of the controller 50 (FIG. 2). This switching control action connects the battery cell strings 13 of battery modules 12A and 12B in electrical series to accept power from the off-board DC fast-charging station 30 of FIG. 1 at the combined voltage of both battery cell strings 13. Here, RESS #1 with the battery module 12A supplies the F-TPIM 25 and R-TPIM 125 and HV accessory circuits 18 and 180 in parallel. Thus, current paths (arrows AA, BB, CC, DD) are formed between the battery modules 12A and 12B in the series charge mode (SCh1).

Since accessory power is drawn from one of the battery modules 12A or 12B and not the other, a divergence in state of charge may result depending on the charging rate and accessory power consumption. In this case, it is possible to alternate between the series charging mode (SCh1) and the other series charging mode (SCh2), the switching states for which are depicted in FIG. 3. That is, to transition from series charge mode (SCh1) to series charge mode (SCh2), switches SA1 and SA2 are opened and switches SB1 and SB2 are closed. This alternation may occur at regular intervals as needed to balance accessory power between the battery modules 12A and 12B, and to keep the state of charge difference within a prescribed limit.

Figure 6:
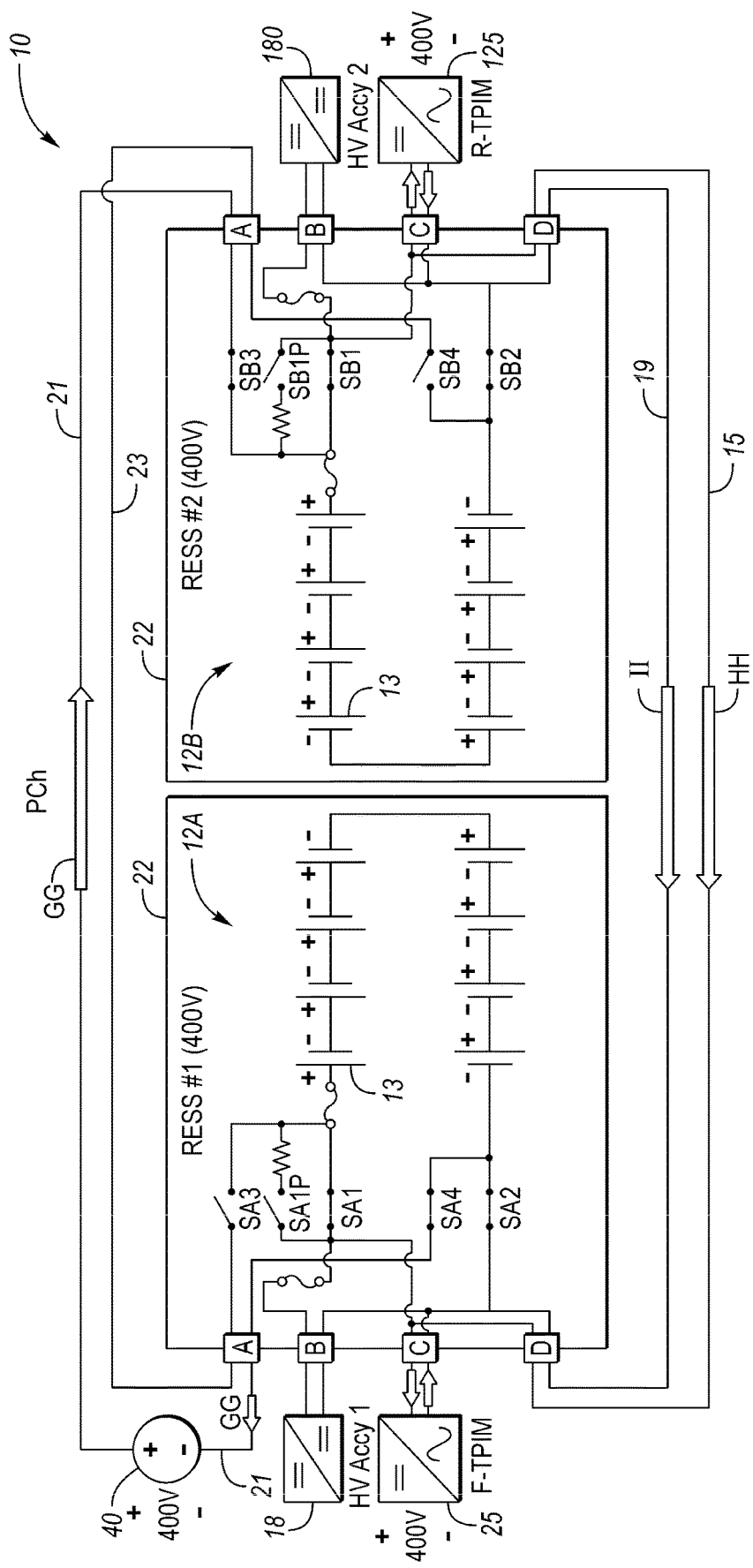

PARALLEL CHARGE MODE: in the parallel charge mode (PCh) shown in FIG. 6, with a 400 VDC charging voltage from the DC fast-charging station 30 (FIG. 1), the switches SB3 and SA4 are commanded closed in addition to switches SA1, SA2, SB1, and SB2 as in the parallel drive mode. This action of the controller 50 allows the off-board DC fast-charging station 30 of FIG. 1 to charge the battery modules 12A and 12B in parallel, with the charging current (arrow GG) supplied first to the battery module 12B. Additionally, the propulsion circuits, including F-TPIM 25 and R-TPIM 125, and the HV accessory circuits 18 and 180, are connected in parallel to the DC fast-charging station 30. This state allows either accessory power circuit 18 or 180 to provide accessory power needed to operate fans, pumps, controllers, etc., during charging. Current flow is as indicated by arrows II and HH.

Figure 7:
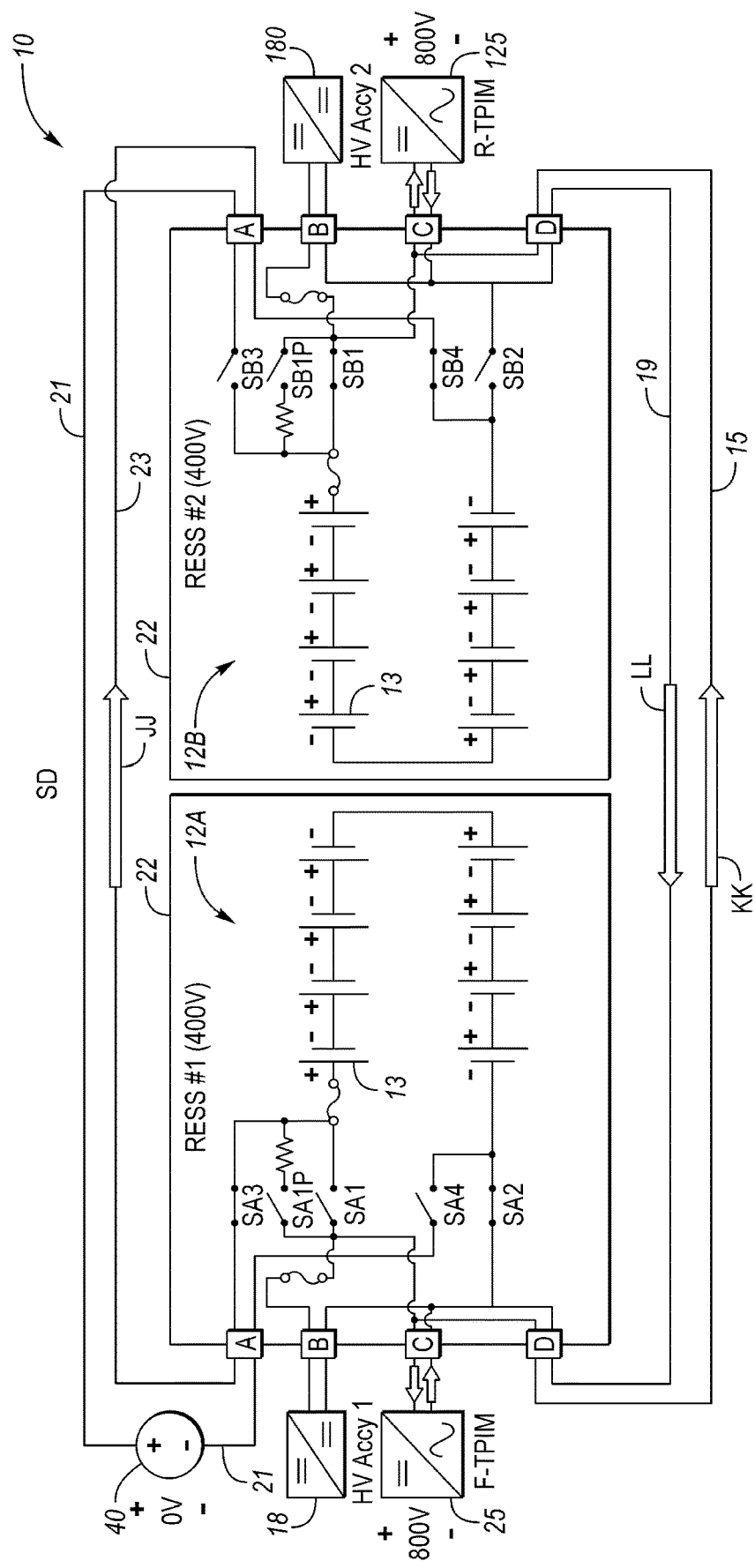

SERIES DRIVE MODE (SD): in this mode, as depicted in FIG. 7, switches SA1, SA4, SB2, and SB3 are commanded open by action of the controller 50, with the open state of switches SB3 and SA4 isolating the DC charge connector pins of the DC charge connector 40. The switches SA3 and SB4 are closed to connect the battery modules 12A and 12B in electrical series. The closed state of switches SA2 and SB1 connects the F-TPIM 25 and R-TPIM 125 across the now-series combination of battery modules 12A and 12B. In series drive mode, the series connection of the battery modules 12A and 12B is achieved via the electrical cable 23 extending between the power connectors A. Rather than powering the F-TPIM 25 or the R-TPIM 125 from only one RESS as in the parallel drive mode described above and shown in FIG. 4, the battery cell strings 13 are combined in series to enable higher voltage operations.

Additional modes are possible, including modes RESS #1D, RESS #2D, RESS #1Ch, and RESS #2Ch. These four additional modes allow the disconnection of one of the two battery modules 12A or 12B as needed during driving or charging. This fault-tolerant capability allows the vehicle 20 to maintain availability of driving or charging functions in the event of failure of either of the two battery modules 12A or 12B. In such a condition, driving or charging power is limited to the capability of a single battery module 12A or 12B and the particular RESS #1 or RESS #2 thereof.

RESS #1D: for the first RESS drive mode, the switches SA1 and SA2 are closed to connect the battery module 12A to the F-TPIM 25 and the HV accessory circuit 18, with the connection to the R-TPIM 125 and the HV accessory circuit 180 provided through the external cable connecting battery modules 12A and 12B.

RESS #1Ch: for the first RESS charge mode, the switches SA4 and SB3 are closed to connect the DC charge connector pins of charge connector 40 across battery module 12A or 12B, thereby allowing DC charging. Switch SB1 is open in order to isolate cells within the battery module 12B from the F-TPIM 25 and R-TPIM 125, the HV accessory circuits 18 and 180, and the DC charge connector 40.

RESS #2D: analogously to mode RESS #1D, the switches SB1 and SB2 are closed to connect the battery module 12B to the R-TPIM 125 and HV accessory circuit 180, with the connection to the F-TPIM 25 and accessory circuit 18 provided through the external cable connecting battery modules 12A and 12B.

RESS #2Ch: similar to mode RESS #1Ch, in the second RESS charging mode RESS #2Ch the switches SA4 and SB3 are closed by action of the controller 50 so as to connect the DC charge connector pins of the DC charge connector 40 across the battery module 12B, thereby allowing DC charging to occur. Switch SA1 is open to isolate battery module 12A from the F-TPIM 25 and R-TPIM 125, the accessory circuits 18 and 180, and the DC charge connector 40.

As will be appreciated by one of ordinary skill in the art, the battery circuit topography noted above may be used with electric vehicles and other systems having increased high-power charging requirements. With legacy DC fast-charging infrastructure generally on the order of 400-500 VDC, the disclosed battery pack 10 enables use of the battery modules 12A and 12B in series or parallel to provide AWD capability to the vehicle 20 of FIG. 1, with legacy or high-power charging both being options. In terms of manufacturing, a single one of the battery modules 12A or 12B may be used in some configurations, e.g., a single battery pack 10 having a maximum voltage capacity of 400-500 VDC, or the battery modules 12A and 12B may be arranged as in FIG. 2 to provide the disclosed level of charging and propulsion voltage flexibility.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. A modular battery pack system comprising:
   a battery pack having:
      a plurality of electrical cables;
      first and second battery modules electrically interconnected to each other via the plurality of electrical cables, the first and second battery modules having respective battery cell strings, first, second, and third electrical connectors, and first, second, third, and fourth switches that selectively connect the respective battery cell strings to one or more of the first, second, and third electrical connectors; and
      a direct current (DC) charge connector electrically connected to one of the electrical cables between the first electrical connectors of the first and second battery modules, the DC charge connector being configured to electrically connect the battery pack to an off-board DC fast-charging station; and a controller in communication with the first, second, third, and fourth switches of the first and second battery modules, the controller being programmed to execute a series charge mode, a parallel charge mode, and one or more of a series drive mode and a parallel drive mode of the battery pack, wherein the controller is configured to receive input signals indicative of a requested operating mode of the battery pack, and, in response to the input signals, to select an open/closed state of each of the first, second, third, and fourth switches of the first and second battery modules, via a set of switching control signals, to thereby establish the series charge mode, the parallel charge mode, and the one or more of the series drive mode and parallel drive mode of the battery pack.

2. The system of claim 1, wherein the first and second battery modules have a respective voltage capacity of 400-500 VDC such that the battery pack has a voltage capacity of 800-1000 VDC when operating in the series drive mode and the series charge mode.

3. The system of claim 1, wherein:
the first and second switches of the first and second battery modules, when in a closed state, connect the respective battery cell strings of a respective one of the first and second battery modules to the second and third electrical connectors of the first and second battery modules, respectively; and
the third and fourth switches of the first and second battery modules, respectively, when in a closed state, connect the respective battery cell strings of a respective one of the first and second battery modules to the first electrical connector of the first and second battery modules, respectively.

4. The system of claim 3, wherein the series charge mode includes at least first and second series charge modes, and wherein the controller is configured, responsive to a threshold divergence in a state of charge of the first and second battery modules, to alternate between the first and second series charge modes by changing the open or closed states of the first and second switches of the first and second battery modules.

5. The system of claim 1, further comprising: first and second traction power inverter modules (TPIMs) directly connected to the third electrical connector of the first and second battery modules, respectively, and first and second electric machines connected to the first and second TPIMs, respectively.

6. The system of claim 5, wherein the modular battery pack system is used aboard a motor vehicle having front and rear drive wheels respectively connected to front and rear drive axles, the front and rear drive axles being driven by the first and second battery modules, respectively.

7. The system of claim 1, wherein each of the first and second battery modules respectively includes a fourth electrical connector in parallel with the third electrical connector, the system further comprising:
first and second accessory circuits directly connected to the fourth electrical connector of the first and second battery modules, respectively.

8. The system of claim 1, wherein the first and second battery modules have a respective first surface to which the electrical connectors of the respective first and second battery modules are connected, and a second surface positioned opposite the first surface and characterized by an absence of the electrical connectors, and wherein the first and second battery modules are arranged in the battery pack such that the second surfaces are positioned immediately adjacent to one another.

9. The system of claim 1, wherein the controller is further configured to selectively establish a power-down mode in which the first, second, third, and fourth switches of the first and second battery modules are opened via the set of switching control signals.

10. The system of claim 1, wherein the controller is configured to detect a fault mode in which a fault is present in the first or second battery modules, and to enter a default drive or charging mode using the first or second battery module that is not experiencing the fault.

11. The system of claim 1, wherein at least one switch of the first, second, third, and fourth switches of the first and second battery modules includes one or more of a solid-state switch and a diode.

12. The system of claim 1, wherein at least one switch of the first, second, third, and fourth switches of the first and second battery modules is an electro-mechanical contactor.

13. A motor vehicle comprising:
front and rear drive axles;
front and rear drive wheels connected to the front and rear drive wheels, respectively;
front and rear traction power inverter modules (TPIMs);
front and rear electric machines connected to and driven by the front and rear TPIMs, respectively; and
a modular battery pack system comprising:
a battery pack connected to the front and rear TPIMs, and having:
a plurality of electrical cables;
first and second battery modules, electrically interconnected to each other via the plurality of electrical cables, each of the first and second battery modules having a respective battery cell string, first, second, and third electrical connectors, and first, second, third, and fourth switches that selectively connect the respective battery cell strings to one or more of the first, second, and third electrical connectors, the front and rear TPIMs being directly connected to the second electrical connector of the first and second battery modules, respectively; and
a direct current (DC) charging connector electrically connected to one of the electrical cables between the first electrical connectors of the first and second battery modules, the DC charging connector being configured to electrically connect the battery pack to an off-board DC fast-charging station; and
a controller in communication with the first, second, third, and fourth switches of the first and second battery modules, the controller being programmed to execute a series charge mode, a parallel charge mode, and one or more of a series drive mode and a parallel charge mode of the battery pack, wherein the controller is configured to receive input signals indicative of a requested operating mode of the battery pack, and, in response to the input signals, to select an open/closed state of each of the first, second, third, and fourth switches of the first and second battery modules, via a set of switching control signals, to thereby establish the series charge mode, the parallel charge mode, and the one or more of the series drive mode and parallel drive mode of the battery pack.

14. The motor vehicle of claim 13, wherein the controller is configured to execute the series drive mode, and wherein the first and second battery modules have a respective voltage capacity of 400-500 VDC such that the battery pack has a voltage capacity of 800-1000 VDC when operating in the series drive mode and the series charge mode.

15. The motor vehicle of claim 13, wherein the controller is configured to execute the series charge mode, and the series charge mode includes at least a first and a second series charge modes, and wherein the controller is further configured, responsive to a threshold divergence in a state of charge of the first and second battery modules, to alternate between the first and second series charge modes by changing the open or closed states of the first and second switches of the first and second battery modules.

16. The motor vehicle of claim 13, further comprising first and second accessory circuits, wherein each of the first and second battery modules includes a fourth electrical connector, and wherein the first and second accessory circuits are directly connected to the fourth electrical connector of the first and second battery modules, respectively.

17. The motor vehicle of claim 13, wherein the first and second battery modules have a respective first surface to which the electrical connectors of the respective first and second battery modules are connected, and a second surface positioned opposite the first surface and characterized by an absence of the electrical connectors, and wherein the first and second battery modules are arranged in the battery pack such that the second surfaces are positioned immediately adjacent to one another.

18. The motor vehicle of claim 13, wherein the controller is configured to detect a fault mode in which a fault is present in the first or second battery modules, and to enter a default operating mode using the first or second battery module not experiencing the fault.

19. The motor vehicle of claim 13, wherein at least one switch of the first, second, third, and fourth switches of the first and second battery modules includes one or more of a solid-state switch and a diode.

20. The motor vehicle of claim 13, wherein at least one switch of the first, second, third, and fourth switches of the first and second battery modules is an electro-mechanical contactor.

* * * * *